United States Patent [19]
Chang

[11] 3,774,082
[45] Nov. 20, 1973

[54] TIME INTERLOCK FOR AIR CONDITIONING COMPRESSOR AND THE LIKE

[75] Inventor: Tom C. Chang, Hollywood, Calif.
[73] Assignee: Cam-Stat Incorporated, Los Angeles, Calif.
[22] Filed: Oct. 18, 1972
[21] Appl. No.: 298,463

[52] U.S. Cl......... 317/141 S, 317/13 A, 317/36 TD
[51] Int. Cl. ........................................... H02h 7/085
[58] Field of Search ............. 317/13 A, 13 B, 13 C, 317/40 R, 132, 141 S, 36 TD; 318/432, 445, 471, 484; 290/37, 38

[56] References Cited
UNITED STATES PATENTS 3,716,756  2/1973  Runge et al...................... 317/13 A
3,660,718  5/1972  Pinckaers......................... 317/13 B
3,582,715  6/1971  Traina ............................ 317/141 S Primary Examiner—J. D. Miller
Assistant Examiner—Harry E. Moose, Jr.
Attorney—Ford W. Harris, Jr. et al.

[57] ABSTRACT

A circuit for controlling a load, such as the cooling compressor of an air conditioner, to prevent short cycling. A circuit which provides a time delay or interlock after de-energizing a load, before the load can again be energized. A circuit operable to connect a load and a storage capacitor to a power source in response to external switch closure, and on opening of the switch, to disconnect the load and utilize the charged capacitor to block for a period of time, further load switching regardless of external switch operation.

8 Claims, 1 Drawing Figure

3,774,082
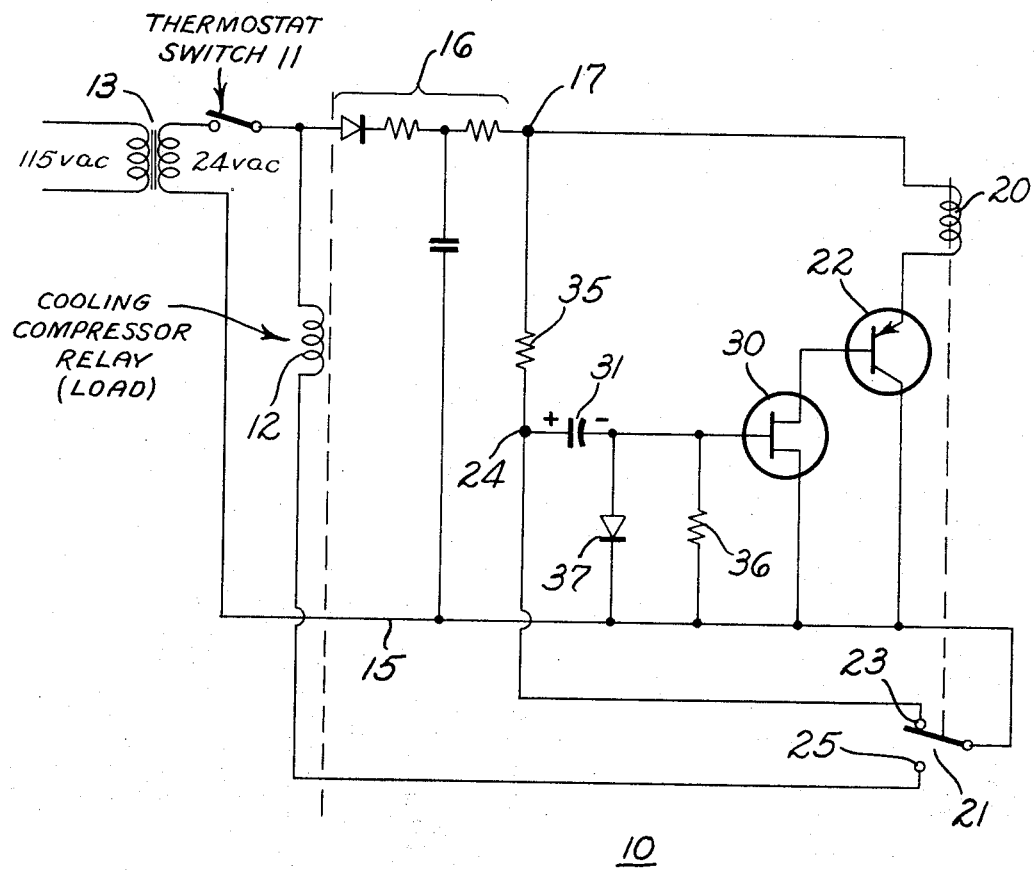

TIME INTERLOCK FOR AIR CONDITIONING COMPRESSOR AND THE LIKE

This invention relates to time delay circuits and in particular, to a new and improved time interlock or time delay circuit which provides a predetermined time interval after de-energization of a load before the load can again be energized. The time delay circuit is especially adapted for use in preventing short cycling of air conditioning compressors but is readily adapted for use in various applications requiring interlock protection.

After an air conditioning compressor has been turned off, it is desirable that the control system prevent turning on of the compressor for a period of time, typically three to five minutes, in order to prevent damage and excessive wear. Some cooling systems have a tendency for a variety of reasons to turn on and turn off at relatively short intervals and this undesirable phenomenon is usually referred to as short cycling. Time delays or interlocks are incorporated in cooling systems to prevent the short cycling mode of operation.

A variety of devices have been utilized in the past for the time delay control. One form of prior art device utilizes a conventional motor driven timer to provide the desired delay. Another type of prior art device utilizes the charging of a capacitor through a resistor, with the magnitude of the delay being a function of the time constant of the RC circuit. One such prior art circuit is described in Appliance Engineer, Volume 5, No. 5, 1971, p. 24.

While the resistance-capacitance system does away with the need for the motor driven timer, there are some disadvantages in the present systems. The systems are relatively complex and require the electric power source to be on at all times. For example, the five minute delay starts when the thermostat switch opens and the compressor is turned off. However, since the time delay results from the charging of the capacitor of the RC circuit, the main power supply must remain on, or the time delay will be present at a subsequent time when the main power is turned on. Further, the prior art solid state devices are relatively complex and are not readily installed by simple interconnection between the thermostat switch and compressor relay.

Accordingly, it is an object of the present invention to provide a new and improved delay circuit that is simple, small, reliable and inexpensive. A further object is to provide such a circuit which can be directly installed between a thermostat switch and a compressor relay. An additional object is to provide a circuit which can be utilized for a variety of delays or interlock applications.

It is a particular object of the invention to provide a new and improved time delay circuit which does not require any standby power supply to obtain the delay and in particular, one which utilizes discharging rather than charging to obtain the delay. A further object is to provide such a system which can be manufactured for any particular desired delay and which will not require timing adjustment.

Other objects, advantages, features and results will more fully appear in the course of the following description. The single FIGURE of the drawing is an electrical schematic of the preferred embodiment of the present invention and is given by way of illustration or example.

In the FIGURE of the drawing, a time delay circuit 10 is connected between a control switch such as a thermostat switch 11 and a load such as a cooling compressor relay 12. The system typically may be energized from a 115 volt A.C. supply with a stepdown transformer 13 providing a low voltage such as 24 volts at the secondary winding. One terminal of the secondary winding of the transformer 13 is connected to the relay 12 and delay circuit 10 by the switch 11, and the other terminal of the secondary winding is connected to a common line 15 of the delay circuit.

The delay circuit preferably includes a rectifier and filter combination 16 which provides D.C. power at point 17. A switching unit, typically a relay with coil 20 and single pole double throw contact set 21 is connected with the coil 20 in series with a transistor 22 across the D.C. supply 17, 15. The moving arm of the contact set 21 is connected to the common line 15, with contact 23 connected to point 24 and with contact 25 connected to the relay 12. With the relay coil 20 unenergized, the moving arm of contact set 21 engages contact 23.

A field effect transistor 30 is connected between the base of transistor 22 and line 15, with a capacitor 31 connected between point 24 and the base of transistor 30. A resistor 35 is connected between points 17 and 24. A resistor 36 and a diode rectifier 37 are connected between the base of the transistor 30 and line 15.

The time delay circuit operates in the following manner to provide the desired interlock function. Initially control switch 11 is open and the delay circuit 10 and load 12 are disconnected from the voltage source. All capacitors are discharged and all relay coils are unenergized.

When switch 11 is closed, point 24 is connected to line 15 and relay coil 20 is unenergized. The D.C. potential builds up at point 17 as the capacitor of the filter 16 charges. The input or base of the field effect transistor 30 is maintained at about 0.6 volts above the common or circuit ground potential on line 15 due to the clamping action of the diode 37. The transistor 30 is biased at minimum drain source resistance region and transistor 22 is immediately driven into saturation. The coil 20 is energized and the relay moves the arm of the contact set 21 to fixed contact 25. This switching operation connects the power source from the transformer 13 through the control switch 11 to the load 12. In the illustrated embodiment, the control switch 11 is a thermostat switch and the load 12 is the cooling compressor relay, with thermostat switch closure producing substantially immediate compressor start.

The switching action produced by energizing the relay coil 20, disconnects point 24 from the common line 15. Capacitor 31 then starts charging through resistor 35 to the potential at point 17, and remains charged as long as switch 11 remains closed. During this time, transistors 30 and 22 are on and the relay coil 20 and the load 12 are energized.

When switch 11 is opened, relay coil 20 is de-energized and the moving arm of the contact set 21 switches to contact 23, disconnecting the load relay 12 from the power source. Point 24 is connected to the common line 15. When switch 11 was closed, tje plus side of capacitor 31 was at the potential of point 17, say plus 6 volts (with the common line 15 at 0 volts). When point 24 is connected to the line 15, the plus side of capacitor 31 is dropped to 0 volts with the result that the minus side of capacitor 31 changes to minus 6 volts, since the capacitor does not discharge instantaneously.

This negative voltage at the negative side of capacitor 31 and hence at the gate of transistor 30 biases the transistor 30 into its off region and turns off transistor 22. Both transistors will remain in the off state as long as there is a negative voltage bias at the gate of transistor 30 sufficient to hold the transistor 30 off. Capacitor 31 discharges through resistor 36, with the gate voltage of transistor 30 rising as the capacitor discharges. The transistor 30 desirably has an extremely high input resistance and the diode 37 desirably has low leakage reverse current so that the capacitor discharge path is primarily through the resistor 36, with the time constant of this R.C. circuit and the potential of point 17 determining the duration of delay. The time delay is the time required for the gate potential of transistor 30 to rise to a point at which the transistor can be turned on. If switch 11 is closed prior to this time, nothing occurs in the delay circuit, that is, transistors 30 and 22 remain off and the relay coil 20 remains unenergized. If the switch 11 is closed after the gate potential of transistor 30 has raised to the turn-on value, the transistors will turn on and the coil 20 will be energized, as previously described.

During the discharge of the capacitor 31, closing and opening the switch 11 has no effect on the operation. No standby or other power source is required in order to obtain the delay. Closing and opening the control switch does not change the duration of the delay or restart the delay cycle. That is to say, the predetermined delay as established by the parameters of the system is achieved and is not shortened or lengthened by any external factors.

I claim:

1. In a circuit for energizing a load from a power source by a control switch not less than a predetermined time after de-energization of the load, the combination of:

switching means operable between first and second conditions;
   a control unit for said switching means;
   a storage circuit;
   a discharge circuit for said storage circuit;
   with said switching means when in said second condition connecting said storage circuit to the power source through the control switch for charging said storage circuit from the power source when the control switch is closed, and connecting the load to the power source through the control switch for energizing the load; and
   circuit means connecting said storage circuit to said control unit for maintaining said switching means in said first condition when said storage circuit is charged to a predetermined value and said switching means has switched to said first condition;
   with said switching means switching to said first condition when the control switch is opened disconnecting the power source and with said storage circuit discharging through said discharge circuit and blocking actuation of said switching means to said second condition until discharged to a predetermined value.

2. A circuit as defined in claim 1 wherein said switching means when in said first condition includes a shunting connection across said storage circuit.

3. A circuit as defined in claim 1 wherein said switching means includes a transistor connected across the power source and normally biased into conduction to said second condition by said control unit when the control switch is closed, with said storage circuit blocking said conduction for a time after the control switch is opened.

4. A circuit as defined in claim 1 wherein said storage circuit includes a capacitor connected across the power source for charging through said discharge circuit when said switching means is in said second condition and connected across said discharge circuit when said switching means switches to said first condition, providing a voltage change at said control unit.

5. A circuit as defined in claim 4 wherein said control unit includes a transistor with the bias thereof provided through said capacitor, with said transistor when biased to nonconduction preventing said switching means from switching to said second condition.

6. In a circuit for energizing a load from a power source by a control switch not less than a predetermined time after de-energization of the load, the combination of:

a first transistor;
   a storage capacitor connected between a first point and the gate of said first transistor;
   a resistor and a rectifier connected in parallel between a second point and the gate of said first transistor;
   circuit means connecting said first and second points across the power source through the control switch; and
   switching means controlled by said first transistor for switching between first and second conditions and including means connecting said first point to said second point when in said first condition and connecting the load to said second point when in said second condition,
   with said capacitor charging when the control switch is closed and said switching means is in said second condition and discharging when the control switch is opened and said switching means is changed to said first condition.

7. A circuit as defined in claim 6 wherein said switching means includes relay means with single pole double throw contact means and actuating element, and a second current control transistor in series with said element across the power source, with said first transistor controlling said second transistor.

8. A circuit as defined in claim 7 wherein the power source is an A.C. source, and including a rectifier-filter circuit for connection between the power source and said first and second points providing D.C. power for said capacitor and switching means.

* * * * *